United States Patent [19]
Stephenson et al.

[11] Patent Number: 5,303,636
[45] Date of Patent: Apr. 19, 1994

[54] FLUID CONTROLLER AND LOGIC CONTROL SYSTEM FOR USE THEREWITH

[75] Inventors: Dwight B. Stephenson, Savage; James J. Hastreiter, Eden Prairie, both of Minn.

[73] Assignee: Eaton Corporation, Cleveland, Ohio

[21] Appl. No.: 850,712

[22] Filed: Mar. 13, 1992

Related U.S. Application Data

[60] Division of Ser. No. 703,318, May 20, 1991, Pat. No. 5,115,640, which is a continuation-in-part of Ser. No. 513,366, Apr. 23, 1990, Pat. No. 5,016,672.

[51] Int. Cl.$^5$ ............................................. F15B 9/09
[52] U.S. Cl. .................................... 91/471; 60/384; 91/361; 180/142
[58] Field of Search ............... 91/361, 363 R, 471; 60/384; 180/142

[56] References Cited

U.S. PATENT DOCUMENTS

| | | | |
|---|---|---|---|
| 4,703,819 | 11/1987 | Hosotani | 180/142 X |
| 4,792,008 | 12/1988 | Hosotani | 180/142 |
| 5,020,618 | 6/1991 | Nagao | 60/384 X |

*Primary Examiner*—Gerald A. Michalsky
*Attorney, Agent, or Firm*—L. J. Kasper

[57] ABSTRACT

An improved fluid controller (15) is provided having both rotary valving (47) actuated by the steering wheel (17), and axial valving (49) controlled by an electro-hydraulic valve (113) in response to a correction signal (31). In one embodiment, both the rotary valving and the axial valving are achieved by a primary valve member (63) and a follow-up valve member (65), and both the rotary and axial valving can be actuated simultaneously. Also disclosed is a logic control system for closed-loop control of the electro-hydraulic valve, whereby performance problems such as self-steering, wander, drift, and others are substantially eliminated.

5 Claims, 10 Drawing Sheets

FIG. I

FLUID CONTROLLER AND LOGIC CONTROL SYSTEM FOR USE THEREWITH

CROSS-REFERENCE TO RELATED APPLICATION

This application is a Divisional application of co-pending application U.S. Ser. No. 703,318, filed May 20, 1991, now U.S. Pat. No. 5,115,640, which is a Continuation-in-Part of co-pending application U.S. Ser. No. 513,366, filed Apr. 23, 1990, in the name of Dwight B. Stephenson for a "STEERING VALVE WITH INTEGRAL PARALLEL CONTROL", now U.S. Pat. No. 5,016,672.

BACKGROUND OF THE INVENTION

The present invention relates to fluid controllers of the type used to control the flow of fluid from a source of pressurized fluid to a fluid pressure actuated device such as a steering cylinder which comprises part of a full-fluid-linked steering system. More particularly, the present invention relates to such a steering system including an auxiliary, parallel fluid path and a logic control system for controlling such parallel fluid path.

Although the present invention may be used in connection with fluid controllers of many types, and having various applications, it is especially advantageous when used with a fluid controller of a type used in full-fluid-linked steering systems, and will be described in connection therewith.

A typical fluid controller of the type to which the present invention relates includes a housing which defines various fluid ports, and further includes a fluid meter, a valve means, and an arrangement for imparting follow-up movement to the valve means, in response to the flow of fluid through the fluid meter. The flow through the controller valve means is directly proportional to the area of the variable flow control orifices in the main fluid path, the area of the flow control orifices in turn being proportional to the rate at which the steering wheel is rotated.

A typical example of a vehicle which utilizes a fluid controller of the type to which this invention relates would be an agricultural tractor or combine. There is growing interest in being able to steer such vehicles by means of an electro-hydraulic steering system, and preferably, one which is "closed loop", i.e., one in which there is continuous correction of any "error" between the position of the steered wheels and the position of the steering wheel.

Prior to the present invention, in order to provide a vehicle with both conventional rotary input, full-fluid-linked steering, and some sort of closed loop, electro-hydraulic control, would have required that the vehicle have both a conventional fluid controller and a separate, parallel control system, operable in response to various signals, such as a steered wheel position signal and a steering wheel position signal. Although such systems have been generally known, at least in concept, there has been very limited commercial use of such systems.

One of the problems associated with such systems is the difficulty of coordinating operation of the conventional fluid controller with that of the parallel, electro-hydraulic valve. For example, under certain circumstances, it is desirable for the fluid controller to override the electro-hydraulic valve. It is also desirable, and on many vehicle applications it is absolutely necessary, to be able to manually steer the vehicle with the fluid controller, thus further complicating the coordination between the fluid controller and the electro-hydraulic valve.

Another problem area associated with systems including both fluid controllers and parallel electro-hydraulic valves relates to a series of steering performance criteria which are of particular concern to the vehicle operator. These performance criteria are of special concern in such systems where a portion of the flow to the steering cylinder is independent of the fluid controller and the fluid meter which is typically included in such controllers. For example, there should be no "wander" or "drift" in the steering system, i.e., the steered wheels should not move whenever the operator is not rotating the steering wheel. As another example, there should be proper "knob" control, i.e., whenever the vehicle operator returns a steering wheel knob to a certain position, the steered wheels should always return to a corresponding position. As a final example, it is desirable that corrections made by means of the parallel, electro-hydraulic valve not be readily apparent to the vehicle operator, such that the vehicle operator has the perception of not being fully in control of the steering system.

SUMMARY OF THE INVENTION

Accordingly, it is an object of the present invention to provide an improved fluid controller and a parallel electro-hydraulic control valve without the need for separate, expensive valves, external to the fluid controller, while maintaining the capability of manually steering, or having the fluid controller override the operation of the electro-hydraulic valve, especially in the event of a malfunction in the electronic controls.

It is a more specific object of the present invention to provide an improved fluid controller which achieves the above-stated object by providing the parallel, electro-hydraulic valve within the fluid controller.

It is another object of the present invention to provide an improved fluid controller and logic control system for controlling the parallel, electro-hydraulic valve which satisfies various performance criteria such as those set forth above.

The above and other objects of the present invention are accomplished by the provision of an improved fluid controller operable to control the flow of fluid from a source of pressurized fluid to a fluid pressure operated device. The controller is of the type including housing means defining an inlet port for connection to the source of pressurized fluid, a return port for connection with the system reservoir, and first and second control fluid ports for connection to the fluid pressure operated device. Valve means is disposed in the housing means, and comprises a primary, rotatable valve member and a cooperating, relatively rotatable follow-up valve member, the primary and follow-up valve members defining a neutral rotary position and a rotary operating position in which the primary valve member is rotatably displaced from the neutral rotary position relative to the follow-up valve member. The housing means and the valve members cooperate to define a main fluid path providing fluid communication from the inlet port to the first control fluid port, and from the second control fluid port to the return port, when the valve members are in the rotary operating position. The primary and follow-up valve members define a neutral axial position and an axial operating position. The controller includes means operable to bias the valve members toward the neutral axial position and means operable to displace the valve members to the axial operating position.

The primary valve member defines first and second axial fluid passages, and the follow-up valve member defines a first axial fluid port in continuous fluid communication with the inlet port, and a second axial fluid port in continuous fluid communication with the first control fluid port. The first and second axial fluid ports are blocked from fluid communication with the first and second axial fluid passages, respectively, where the valve members are in the neutral axial position. The first and second axial fluid ports are in fluid communication with the first and second axial fluid passages, respectively, when the valve members are in the axial operating position to thereby define a portion of a parallel fluid path. The axial fluid ports and the axial fluid passages are configured such that when the primary and follow-up valve members are simultaneously defining the rotary operating position and the axial operating position, the valve members and the housing means cooperate to define the main fluid path and the parallel fluid path, simultaneously, whereby the total flow to the fluid pressure operated device is approximately the sum of the flows in the main and parallel fluid paths.

In accordance with another aspect of the present invention, there is provided an improved method of controlling the flow of fluid from a source of pressurized fluid through a fluid controller in response to the position and movement of an input device, to cause the position of a steering cylinder to conform to the position of the input device. The method comprises the steps of providing the fluid controller with main valving operable to define a main fluid path, and control fluid flow therethrough, in response to the movement of the input device, and auxiliary valving operable to define an auxiliary fluid path, and control the flow of fluid therethrough, in response to changes in a command signal. The method further comprises the steps of sensing the position of the input device and generating an input position signal, sensing the position of the steering cylinder and generating an output position signal, and comparing the output position signal to the input position signal and generating the command signal. The method includes the final step of transmitting a signal representative of the command signal to the auxiliary valving and modulating the auxiliary valving to drive the output position signal toward the input position signal.

DESCRIPTION OF THE PREFERRED EMBODIMENTS

Figure 1:
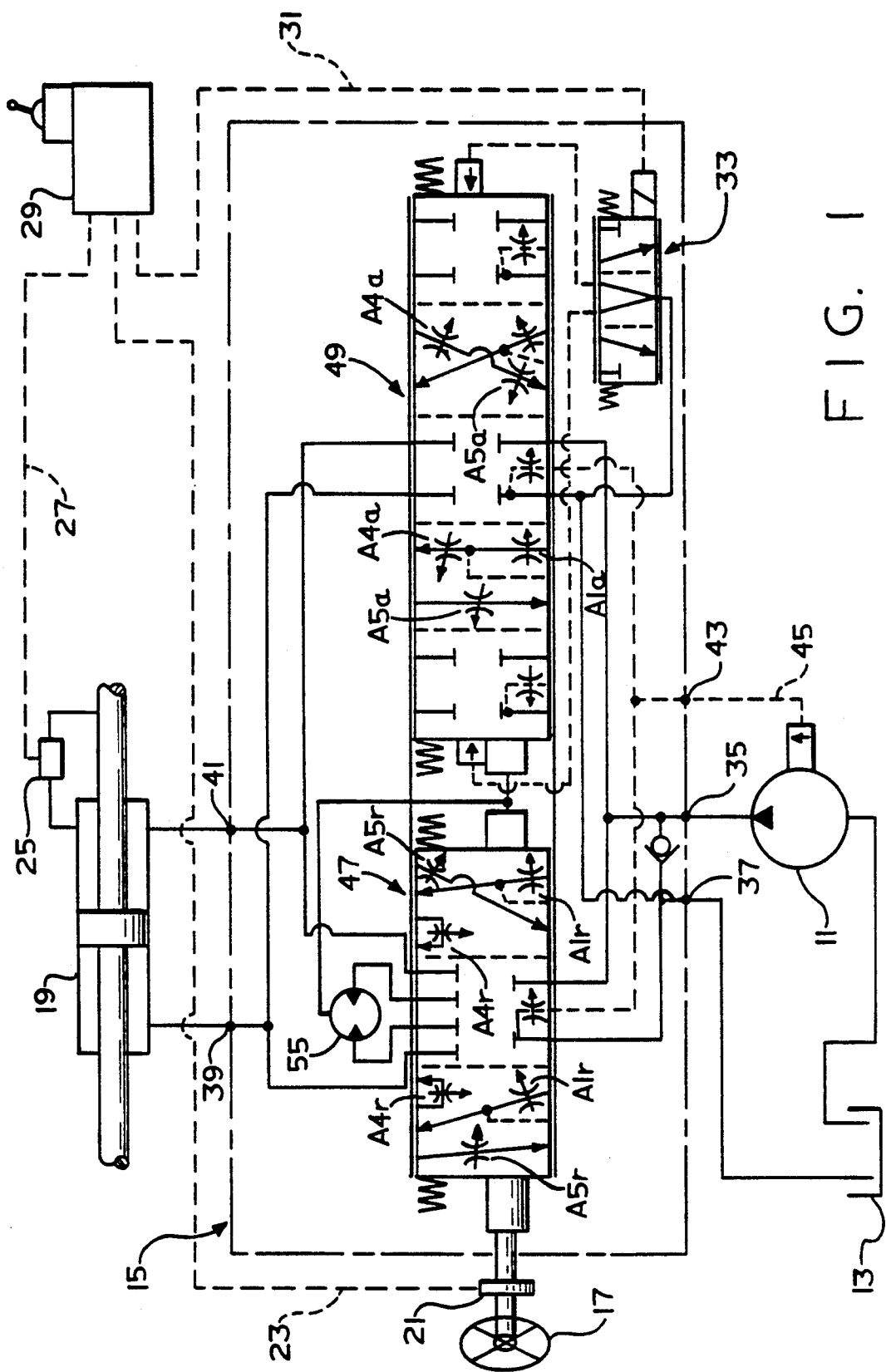
FIG. 1 is a schematic view of a hydrostatic power steering system made in accordance with the present invention.

Referring now to the drawings, which are not intended to limit the invention, FIG. 1 illustrates a vehicle hydrostatic power steering system, including a fluid controller made in accordance with the present invention. The system includes a fluid pump 11, shown herein as a flow and pressure compensated pump, having its inlet connected to a system reservoir 13. The system includes a fluid controller, generally designated 15, which receives rotary input by means of a steering wheel 17, and controls the flow of fluid from the pump 11 to a fluid pressure operated vehicle steering cylinder 19.

In accordance with one important aspect of the present invention, the steering system shown in FIG. 1 includes a steering wheel position sensor 21, which generates an input position signal 23, indicative of the instantaneous rotational position of the steering wheel 17. The system also includes a steered wheel position sensor 25 (which preferably is physically associated with the cylinder 19), which generates an output position signal 27. It will be understood by those skilled in the art that references hereinafter to "steered wheel position" are actually referring to the position of the steering cylinder 19 which, because of its mechanical connection to the steered wheels, is representative of the position thereof.

The input and output position signals 23 and 27 are transmitted to a logic device which, in the subject embodiment, will be described, by way of example only, as a rate select switch and controller 29, the function of which will be described in greater detail subsequently. As is well known to those skilled in the art, the switch 29 compares the signals 23 and 27, and generates a correction signal 31, which is representative of the difference between the desired position of the steered wheels (as indicated by the signal 23) and the actual position of the steered wheels (as indicated by the signal 27). The correction signal is on a scale representative of the rate selected by the vehicle operator, for example, either a "HIGH" rate or a "LOW" rate. The correction signal 31 is transmitted to a pilot stage control, generally designated 33, which will be described in greater detail subsequently.

Referring still to FIG. 1, the fluid controller 15 includes an inlet port 35, a return port 37, and a pair of control (cylinder) fluid ports 39 and 41, which are connected to the opposite ends of the steering cylinder 19. The fluid controller 15 further includes a load signal port 43 which is connected to the flow and pressure compensator of the pump 11 by means of a signal line 45.

In accordance with a primary feature of the present invention, the fluid controller 15 includes valving which is able to perform two distinct, but related, functions, as was illustrated and described in co-pending application U.S. Ser. No. 513,366, now U.S. Pat. No. 5,016,672, which is incorporated herein by reference. The valving includes rotary valving, generally designated 47, the function of which is to define a main fluid path to the cylinder 19, and axial valving, generally designated 49, the function of which is to define a parallel fluid path to the steering cylinder 19. Actuation of the rotary valving 47 is controlled by the steering wheel 17, while actuation of the axial valving 49 is controlled by the pilot stage 33, but may be overridden by rotation of the steering wheel 17, as will be described in greater detail subsequently.

The valving arrangement which has been described generally above is illustrated and described in greater detail in above-incorporated U.S. Ser. No. 513,366, now U.S. Pat. No. 5,016,672. The fluid controller of the parent application may have either rotary input, to define the main fluid path, or axial input to define the parallel fluid path, but does not illustrate or describe a valve which would function to define both the main and parallel fluid paths, simultaneously.

In accordance with one aspect of the present invention, the valving of the fluid controller is configured to have both rotary and axial inputs, simultaneously. By way of general explanation and example only, but not limitation, the rotary input actuates the valving to select direction of steering and direct a certain amount of fluid through the main fluid path, while the axial input actuates the valving to select the remainder of the fluid required for precise control of the total amount of fluid required by the steering cylinder 19. Alternatively, and again by way of example only, the axial input can be used to provide either multiple-ratio or variable-ratio steering.

Figure 2:
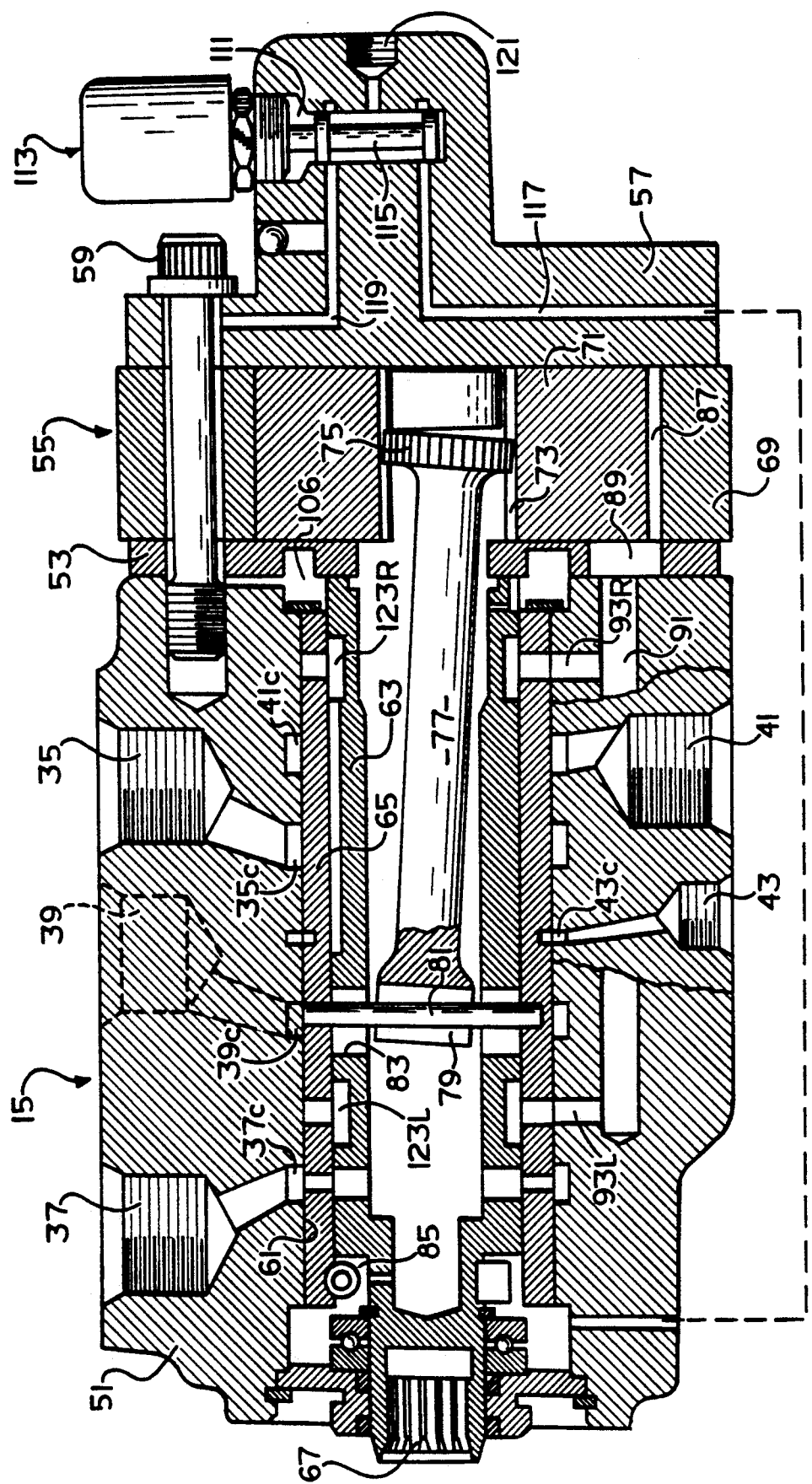
FIG. 2 is an axial cross-section of the fluid controller shown schematically in FIG. 1.

Referring now to FIG. 2, the fluid controller 15 comprises several sections, including a valve housing 51, a wear plate 53, a section comprising a fluid meter 55 (see also FIG. 1), and an endcap 57. These sections are held together in tight sealing engagement by means of a plurality of bolts 59 (only one of which is shown in FIG. 2), which are in threaded engagement with the valve housing 51.

The valve housing 51 defines the inlet port 35, the return port 37, the control ports 39 and 41, and the load sensing port 43. The valve housing 51 further defines a valve bore 61, and rotatably disposed therein is a valving arrangement comprising a primary, rotatable valve member 63 (referred to hereinafter as the "spool"), and a cooperating, relatively rotatable follow-up valve member 65 (referred to hereinafter as the "sleeve"). At the forward end of the spool 63 is a portion having a reduced diameter, and defining a set of internal splines 67, which provide for a direct mechanical connection between the spool 63 and the steering wheel 17. The spool 63 and sleeve 65 will be described in greater detail subsequently, but it should be noted that the spool and sleeve together define both the rotary valving 47 and the axial valving 49.

The fluid meter 55 may be of the type well known in the art, and in the subject embodiment, includes an internally-toothed ring member 69, and an externally-toothed star member 71, which is eccentrically disposed within the ring 69 for orbital and rotational movement relative thereto. The star 71 defines a set of internal splines 73, and in splined engagement therewith is a set of external splines 75 formed at the rearward end of a drive shaft 77. The drive shaft 77 has a bifurcated forward end 79 permitting driving connection between the shaft 77 and the sleeve 65, by means of a drive pin 81. The ends of the pin 81 pass through a pair of oversized pin openings 83 (see FIG. 8), defined by the spool 63, and are received in relatively close-fitting openings in the sleeve 65. The configuration of the pin openings 83 will be described in greater detail in connection with the spool-sleeve layouts of FIGS. 8 through 11.

As is well known to those skilled in the art, pressurized fluid flowing from the inlet port 35 through the various passages defined by the spool 63 and sleeve 65 then flows through the fluid meter 55, causing orbital and rotational movement of the star 71 within the ring 69. Such movement of the star 71 causes rotational follow-up movement of the sleeve 65, by means of the drive shaft 77 and drive pin 81, to maintain a particular relative rotational displacement (referred to hereinafter as a "rotary operating position") between the spool 63 and sleeve 65, proportional to the rate of rotation to the steering wheel 17. Disposed adjacent the forward end (left end in FIG. 2) of the spool 63 is a neutral centering spring arrangement, generally designated 85, of the type which is illustrated and described in greater detail in co-pending application U.S. Ser. No. 602,829, filed Oct. 29, 1990, now U.S. Pat. No. 5,080,135, in the name of Dwight B. Stephenson, for a "LARGE DEFLECTION ANGLE ROTARY MODULATION STEERING VALVE", assigned to the assignee of the present invention and incorporated herein by reference. Typically, the centering spring 85 would include at least one helical, coiled compression spring biasing the sleeve 65 toward a "rotary neutral" position (as that term will be defined in connection with FIG. 8), relative to the spool 63.

Referring still to FIG. 2, the valve bore 61 of the valve housing 51 defines a plurality of annular fluid chambers surrounding the sleeve 65, to provide fluid communication between the various ports and the outer surface of the sleeve 65. An annular chamber 35c receives pressurized fluid from the inlet port 35, while an annular chamber 37c communicates return fluid to the return port 37. An annular chamber 39c provides communication to or from the control port 39, while an annular chamber 41c provides communication to or from the control port 41. Finally, an annular chamber 43c provides communication with the load signal port 43.

The toothed interaction of the star 71, orbiting within the ring 69, defines a plurality of expanding and contracting fluid volume chambers 87, and adjacent each such chamber 87, the port plate 53 defines a fluid port 89. The valve housing 51 defines a plurality of axial bores 91 (only one of which is shown in FIG. 2), each of which is in open communication with one of the fluid ports 89. The valve housing 51 further defines a pair of radial bores 93L and 93R, providing communication between each of the axial bores 91 and the valve bore 61, as will be described in greater detail subsequently.

It is believed that the normal rotary action of a controller of the general type shown in FIG. 1 is now well known to those skilled in the art, and such operation will be described only briefly herein. As the steering wheel 17 is rotated, for example, in the clockwise direction, the spool 63 is also rotated clockwise, as viewed by the vehicle operator, opening up a series of variable flow control orifices (comprising the rotary valving 47) between the spool 63 and the sleeve 65. These orifices permit fluid communication from the inlet port 35 through several of the orifices in series, and then through the radial bores 93R and the axial bores 91 to the expanding volume chambers 87 of the fluid meter 55. Fluid flowing from the contracting volume chambers of the fluid meter flows through the other of the axial bores 91, then through the radial bores 93L, then through another variable orifice in the valving and out the cylinder port 39 to the steering cylinder 19. Fluid returning from the cylinder enters the cylinder port 41, then flows through another variable orifice in the valving, and then out to the return port 37. The above-described fluid path is the one which has been described herein as the "main fluid path", and the use of that term hereinafter will be understood to mean the above-described fluid path, or some portion thereof, when the spool and sleeve are in the rotary operating position.

It should be noted that all of the elements described up to this point are element which are already known, and have been illustrated and described in various prior art patents assigned to the assignee of the present invention. The newly added elements which comprise the various aspects of the present invention will now be described, although many of the elements to be described are illustrated and described in the above-incorporated parent application. In conventional controllers of the spool-sleeve type, the area of the flow orifices in the valving is changed in response only to relative rotation between the spool and the sleeve. Thus, in such controllers, it has been typical for the axial length of the sleeve to be substantially the same as that of the spool (excluding the reduced diameter portion).

It is one important aspect of the present invention to be able to define flow control orifices in the valving in response to both relative rotary motion of the spool and sleeve, and relative axial motion of the spool and sleeve, and as was mentioned previously, to do so simultaneously. In the subject embodiment, by way of example and not limitation, such relative axial motion is accomplished by making the sleeve 65 axially shorter than the adjacent portion of the spool 63, and providing means for axially displacing the sleeve 65, relative to the spool 63, from a neutral axial position to "an axial operating position", as that term will be described in greater detail subsequently.

Figure 3:
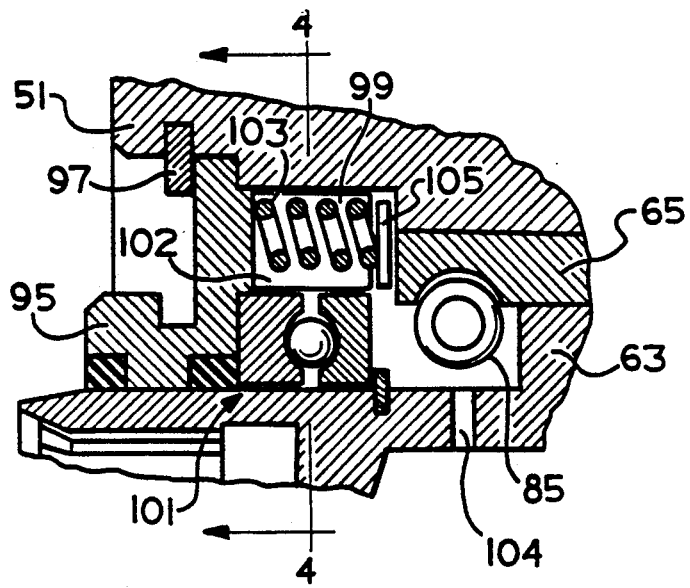
FIG. 3 is an enlarged, fragmentary, axial cross-section, similar to FIG. 2, illustrating one detailed aspect of the present invention.
Figure 4:
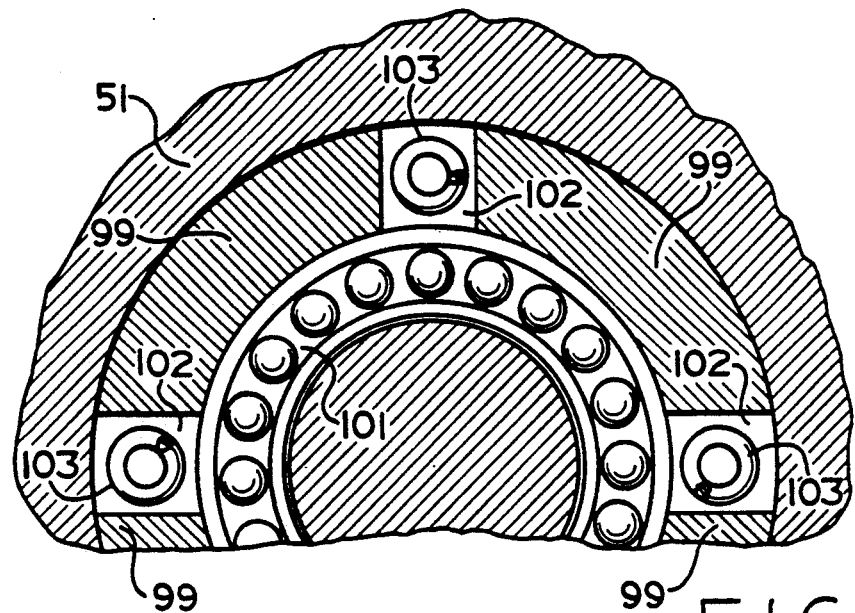
FIG. 4 is a transverse cross-section taken on line 4—4 of FIG. 3, and on approximately the same scale.

Referring now primarily to FIGS. 3 and 4, disposed radially between the valve housing 51 and the spool 63 is a seal gland 95, held in place relative to the valve housing 51 by means of a snap ring 97. As may best be seen in FIG. 4, the seal gland 95 includes four arcuate portions 99, which extend axially rearward (to the right in FIG. 3) from the main body of the seal gland 95. The arcuate portions 99 are closely spaced apart from an adjacent cylindrical surface defined by the valve housing 51. Disposed radially inwardly from the arcuate portions 99 is a ball bearing set 101. The arcuate portions 99 cooperate with the valve housing 51 and the ball bearing set 101 to define four generally square openings 102, and disposed within each of these square openings 102 is a coiled compression spring 103, the springs 103 being seated against the main body of the seal glands 95 at their left end, and against a wear washer 105 at the right end.

Figure 5:
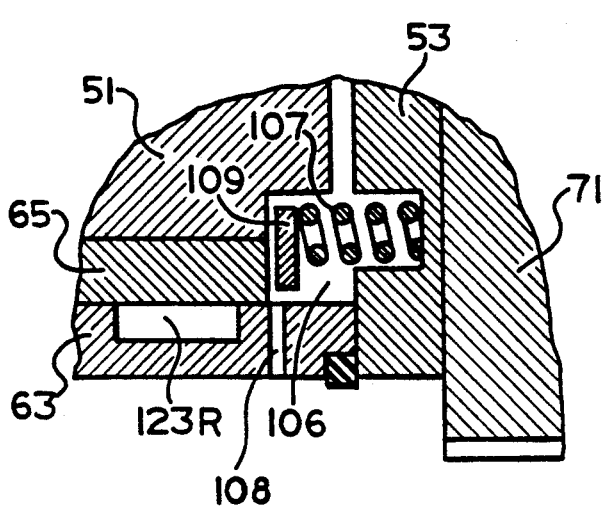
FIG. 5 is an enlarged, fragmentary, axial cross-section, similar to FIG. 2, illustrating another detailed aspect of the present invention.

Referring now to FIG. 5, there is illustrated an arrangement similar to that shown in FIG. 3, wherein the port plate 53 and sleeve 65 cooperate to define a chamber 106, and the port plate 53 defines four openings, and disposed within each opening is a coiled compression spring 107. Each of the springs 107 has its right end in FIG. 5 seated against the port plate 53, and its left end seated against a wear washer 109. The primary function of the springs 103 and the springs 107 is to bias the sleeve 65 toward the neutral axial position shown in FIGS. 3 and 5 or, subsequent to displacement of the sleeve 65 to an axial operating position, to return the sleeve 65 to the neutral axial position.

Referring again to FIGS. 3 and 5, the chamber 102, when pressurized, biases the sleeve 65 to the right in FIG. 3, corresponding generally to the axial operating position illustrated in FIGS. 10 and 11, which will be described subsequently. With the chamber 102 pressurized, the compression springs 107 in the chamber 106 (see FIG. 5) are compressed. Similarly, the chamber 106, when pressurized, biases the sleeve 65 to the left in FIG. 5. With the chamber 106 pressurized, the compression springs 103 in the openings 102 are compressed.

Referring again primarily to FIG. 2, an electro-hydraulic control circuit for effecting axial actuation of the sleeve 65 will be described briefly. The endcap 57 defines a stepped bore 111, adapted to receive an electromagnetic solenoid valve, generally designated 113, which comprises the pilot stage control 33 shown schematically in FIG. 1. The solenoid valve 113 includes a valve spool 115, which is movable from a neutral, centered position as shown in FIG. 2, to either an upward actuated position, or a downward actuated position. The construction and function of the solenoid valve 113 is illustrated and described in greater detail in the above-incorporated parent application, and will be described only briefly herein.

As is illustrated somewhat schematically in FIG. 2, the endcap 57 defines a fluid passage 117 in communication with the chamber 102. Similarly, the endcap 57 defines a fluid passage 119 in communication with the chamber 106, by means of a reduced diameter portion of the bolt 59. The endcap 57 further defines a port 121, which may be in communication with the system reservoir 13, or with some other source of pressure at either a low pressure or a high pressure. Assuming for purposes of explanation that the port 121 is connected to the reservoir, when the valve spool 115 is in the centered position shown in FIG. 2, both of the chambers 102 and 106 are ported to tank and the sleeve 65 remains in the axial neutral position shown in FIGS. 2, 7, and 9. A description of the actuation of the solenoid valve 113 to shift the sleeve 65 to an axial operating position requires a more detailed description of the spool and sleeve, and therefore, will be provided subsequently. Within the scope of the present invention, the solenoid valve 113 could be of the ON/OFF type, in which case it could be pulse-width-modulated between the centered position shown in FIG. 2 and a desired actuated position. Alternatively, the solenoid valve 113 could be of the type providing proportional control anywhere between the two extreme actuated positions. Various other electro-hydraulic control arrangements could also be utilized, all of which are intended to be within the scope of the invention, as long as they perform the function set forth in the appended claims.

VALVING ARRANGEMENT

Figure 7:
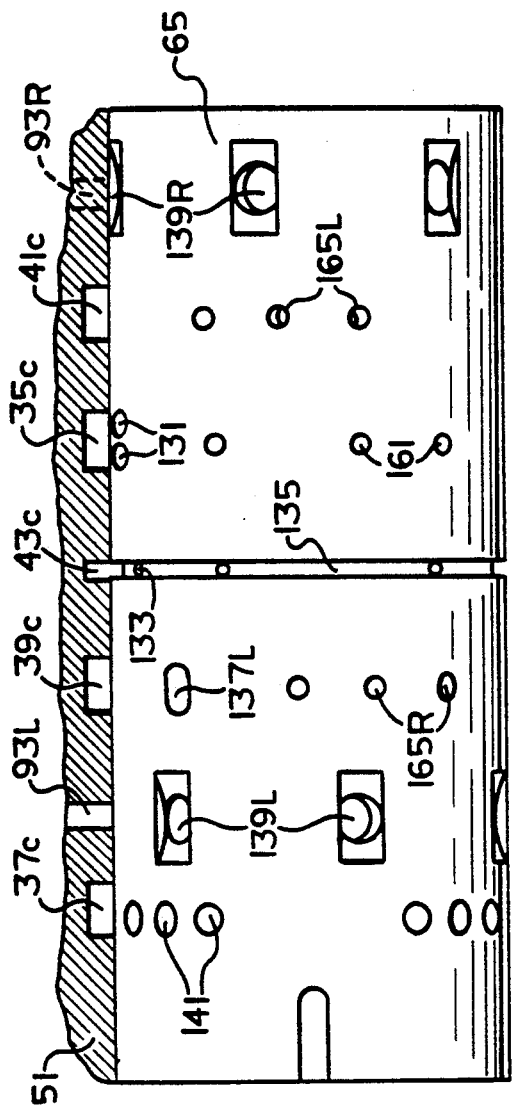
FIG. 7 is an elevation view of the follow-up valve member of the fluid controller shown in FIG. 2, and on substantially the same scale as FIG. 6, with a portion of the valve housing (in axial cross-section) included.
Figure 6:
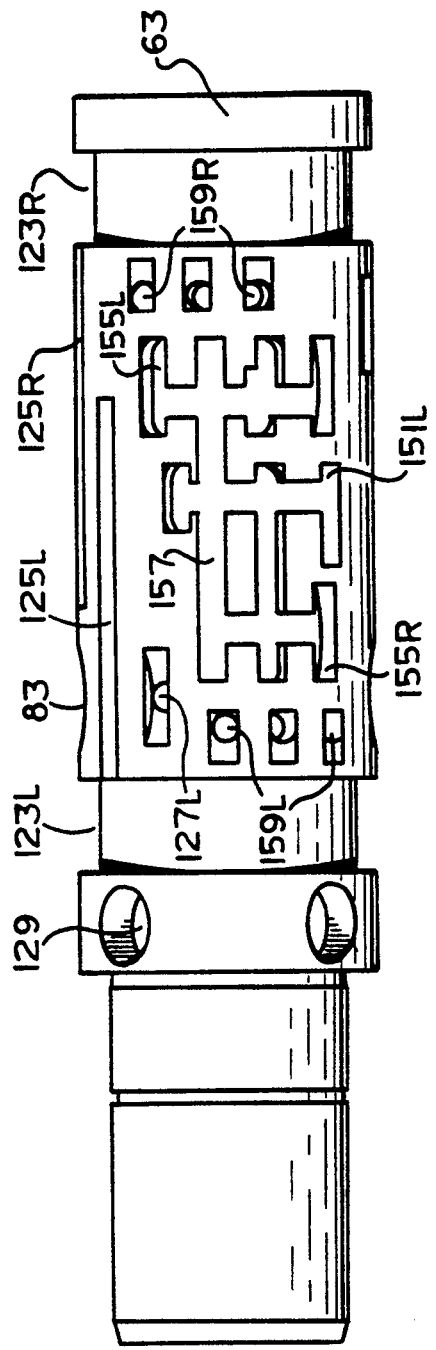
FIG. 6 is an elevation view of the primary valve member of the fluid controller shown in FIG. 2.
Figure 8:
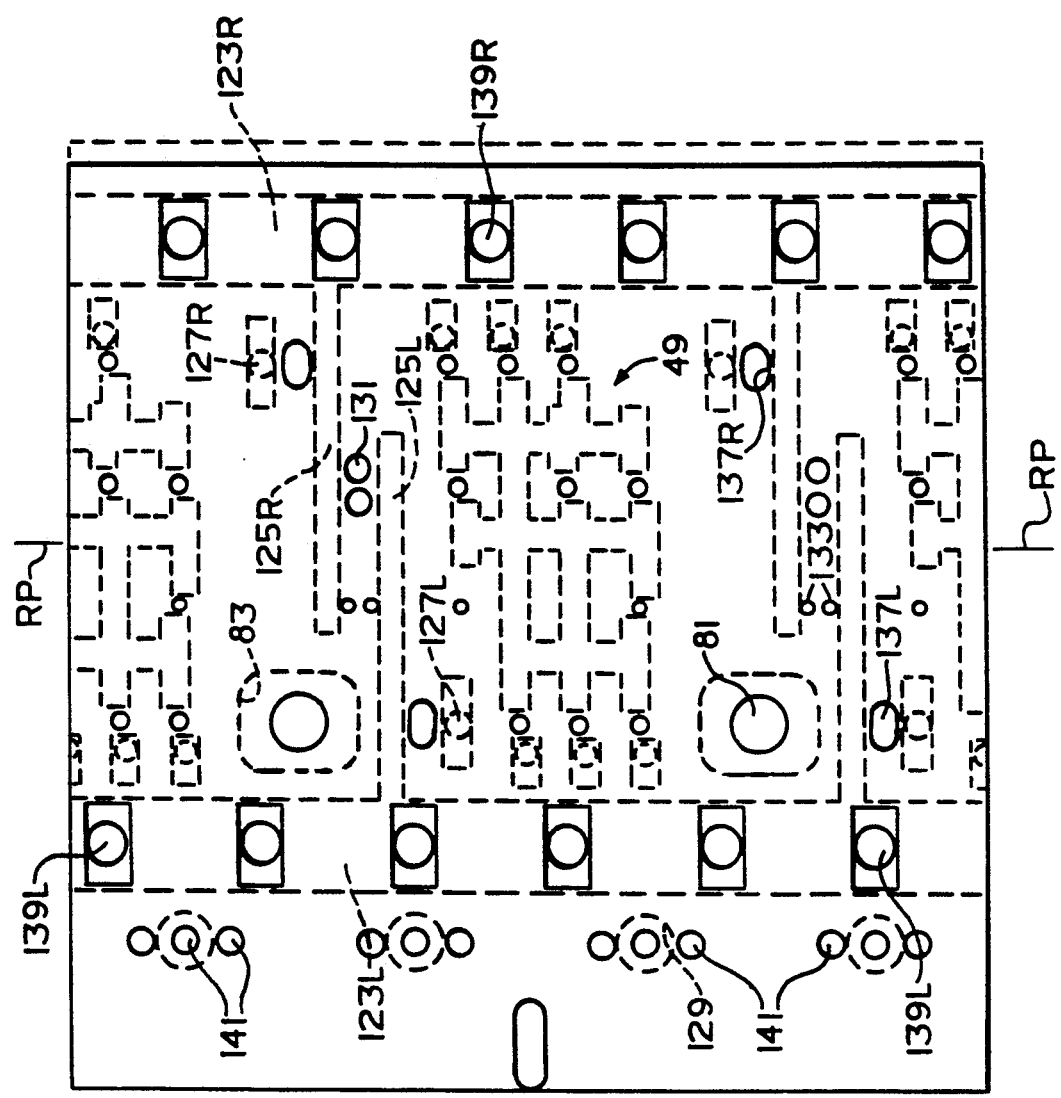
FIG. 8 is an overlay view of the valving used in the fluid controller shown in FIG. 2, but on a larger scale than in FIG. 2, and with the valving in the rotary neutral and axial neutral position.

Referring now to FIGS. 6 through 8, the spool 63 and sleeve 65 will be described in greater detail, with regard to the various ports and passages defined by the spool and sleeve. In connection with the subsequent description, it should be noted that certain of the ports and passages are arranged symmetrically, or generally symmetrically, with respect to an imaginary central reference plain RP (see FIG. 8), and such elements will be described by reference numerals followed by either an "L" or an "R", to indicate that the element is located on either the left side or the right side, respectively, of the reference plain RP. On the other hand certain of the elements do not have a corresponding element, oppositely disposed about the reference plain RP, and will be referred to by use of a reference numeral alone.

It should be understood that the overlay views of FIGS. 8 through 11 are intended to illustrate primarily the interface between the spool 63 (dashed lines) and the sleeve 65 (solid lines), and as a result, certain structural features which appear only on the outer surface of the sleeve 65 will be shown in the elevation view of FIG. 7, but may not be repeated in all of the subsequent spool-sleeve overlay views. It should be noted that in FIGS. 6 and 7, the spool 63 and sleeve 65 are in a relative axial position corresponding to the neutral axial position shown in FIGS. 2, 8, and 9.

The spool 63 defines a pair of annular meter grooves 123L and 123R, which are axially aligned with the radial bores 93L and 93R, respectively. In communication with the meter groove 125L is a pressure passage 125L, and in communication with the meter groove 123R is a pressure passage 125R. Circumferentially adjacent each of the pressure passages 125L is a return passage 127L, and circumferentially adjacent each of the pressure passages 125R, but in the opposite direction, is a return passage 127R. Toward the left end in FIGS. 6 and 8, the spool 63 defines four tank ports 129. Both the return passages 127L and 127R and the tank ports 129 extend to the interior of the spool 63.

Referring now to FIGS. 7 and 8, the sleeve 65 defines two pairs of pressure ports 131, disposed somewhat to the right of reference plane RP. Disposed to the left of each pair of pressure ports 131 is a pair of load sensing ports 133, both of which are in open communication with an annular load sensing groove 135, defined on the outer surface of the sleeve 65. The groove 135 is in continuous communication with the load sensing port 43 by means of the annular chamber 43c. The sleeve 65 further defines an operating port 137L disposed adjacent the return passage 127L, and an operating port 137R, disposed adjacent the return passage 127R. The sleeve 65 further defines a plurality of meter ports 139L in continuous communication with the meter groove 123L, and a plurality of meter ports 139R, in continuous communication with the meter groove 123R. Each of the meter ports 139L and 139R includes a generally rectangular opening defined by the outer surface of the sleeve, and shown only in FIGS. 7 and 8, the purpose of the rectangular openings being to permit commutating fluid communication between the meter ports 139L and 139R, and the radial bores 93L and 93R, respectively, even when the sleeve 65 has been axially displaced in one direction or the other from the neutral axial position shown in FIGS. 7 and 8.

Finally, the sleeve 65 defines a plurality of tank ports 141, each of which is in continuous communication with the return port 37 by means of the annular chamber 37c. All of the ports and passages described thus far relate to the rotary valving 47 which, because it is generally well known in the art, will be described only briefly hereinafter.

Figure 9:
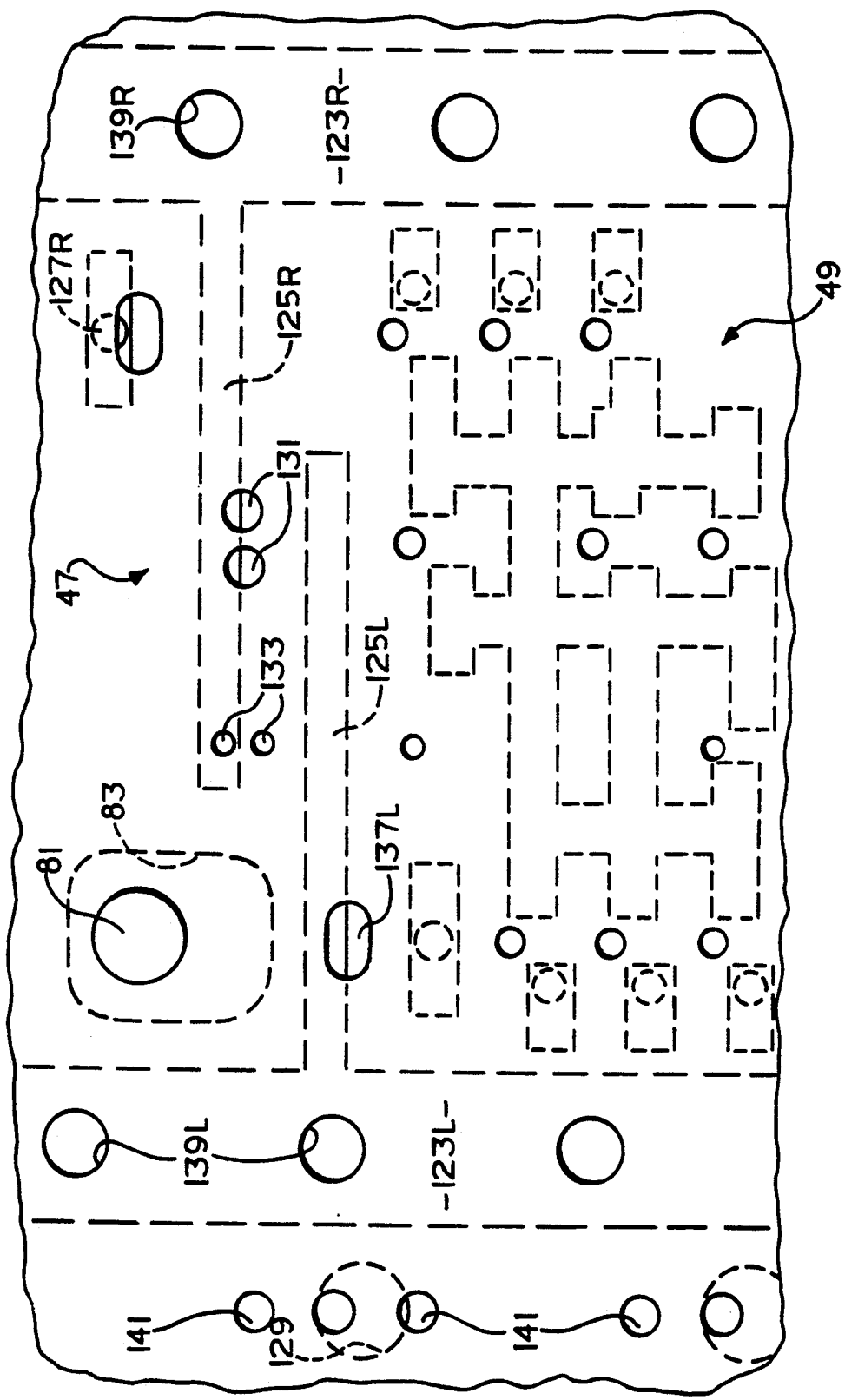
FIG. 9 is an enlarged, fragmentary, overlay view, similar to FIG. 8, but with the valving in a rotary operating, neutral axial, position.

Referring now to FIG. 9, if the steering wheel 17 and the spool 63 are rotated clockwise, (the spool 63 moves "down" in FIG. 9), pressurized fluid flows from the inlet port 35 to the annular chamber 35c, then through the pressure ports 131, which are now overlapping the pressure passage 125R to define a main variable flow control orifice (A1r), the designation "r" after "A1" merely indicating an orifice formed in response to relative rotational movement of the spool and sleeve (see also FIG. 1). At the same time, the pressure in the passage 125R (downstream of the A1r orifice) is being "sensed" or communicated through the upper load sensing port 133 to the load sensing port 43 in the manner described previously. Fluid flowing through the A1r orifice then flows into the meter groove 123R, then through the meter ports 139R to the fluid meter 55, returning from the meter and flowing through the meter ports 139L and into the meter groove 123L. This "metered fluid" then enters the pressure passages 125L, which is now overlapping the operating ports 137L to define a variable flow control orifice (A4r). Metered fluid flows from the A4r orifice into the annular chamber 39c, and from there to the control port 39, then to the steering cylinder 19. Fluid returning from the exhaust side of the steering cylinder 19 flows to the control port 41, then into the annular chamber 41c, and then through an A5r orifice defined by the overlap of the operating ports 137R and the return passages 127R. This return fluid then flows through the interior of the spool 63, then radially out through the tank ports 129, and the tank ports 141 to the annular chamber 37c, and then to the return port 37, and then to the system reservoir 13. The above-described flow path thus comprises the "main fluid path" defined when the spool and sleeve are displaced from the neutral rotary position to a rotary operating position. However, it should be noted that in FIGS. 8 and 9, the spool and sleeve are both still in a neutral axial position relative to each other.

AXIAL ACTUATION OF VALVING

As was the case in the above-incorporated parent application, it is an important aspect of the present invention that the valve members be laid out such that axial actuation thereof results in a parallel fluid path being defined within the fluid controller, which is preferably separate and distinct from the main fluid path which is defined in response to relative rotation of the spool and sleeve. As used herein, "separate and distinct" in reference to the main and parallel fluid paths refers primarily to the fact that the main fluid path flows through the fluid meter 55, whereas the parallel fluid path does not. Obviously, the main and parallel fluid paths are not totally separate and distinct from the standpoint that both paths commence in the annular chamber 35c, and the separate paths recombine at the annular chamber 39c (in the case of a right turn).

In connection with the subsequent description of the axial valving 49, and in the appended claims, many elements (such as ports, passages, etc.) are referred to by means of the term "axial". It will be understood by those skilled in the art that such use of the term "axial" is not necessarily intended to denote a structural feature of the particular element, or a particular orientation, but instead, is intended to indicate that the particular element is related to the axial actuation of the sleeve 65, or is involved in the axial valving 49.

Referring first to FIGS. 8 and 9, it will be noted that substantially all of the elements described so far relate to the rotary valving 47, and that many of those elements are axially adjacent the pin openings 83. It may also be seen in FIGS. 8 and 9 that, disposed circumferentially between the pin openings 83 is an area of ports and passages, not yet described in detail, which comprises the axial valving 49.

Figure 10:
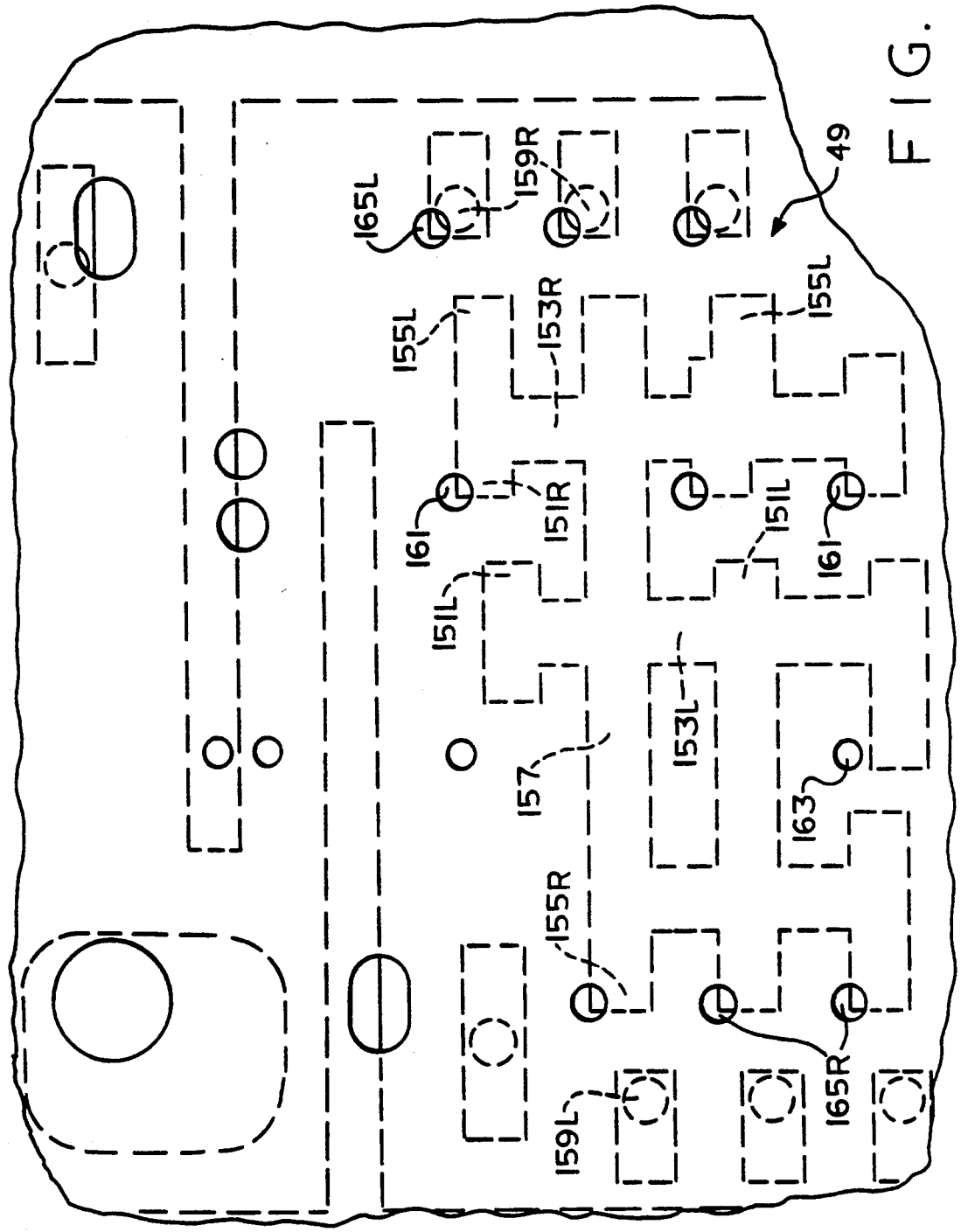
FIG. 10 is a further enlarged, fragmentary, overlay view, similar to FIG. 9, but with the valving in both a rotary operating and axial operating position.

Referring now primarily to FIG. 10, the axial valving 49 will be described in some detail. The spool 63 defines a plurality of pressure passages 151L, which are interconnected by a circumferentially extending passage 153L, and the spool 63 further defines a plurality of pressure passages 151R, which are interconnected by a circumferentially extending passage 153R. The pressure passages 151L are in unrestricted communication with a plurality of operating passages 155L (which are disposed toward the right in FIG. 10) by means of an axial connection passage 157. Similarly, the pressure passages 151R are in unrestricted communication with a plurality of operating passages 155R (which are disposed toward the left in FIG. 10), by the axial connection passage 157. The spool 63 further defines a plurality of tank passages 159L and a plurality of tank passages 159R. In describing the axial valving 49, there are three of each of the various passages which were described by the phrase "a plurality of", but as will be understood by those skilled in the art, that number is not a significant aspect of the invention, but instead, has to do with providing the desired flow capacity through the parallel fluid path.

The sleeve 65 defines a plurality of pressure ports 161 which are in continuous communication with the inlet port 135 through the annular chamber 35c. Disposed to the left of the pressure ports 161 is a single load sensing port 163. The sleeve 65 also defines a plurality of operating ports 165L (disposed toward the right end in FIG. 10), and a plurality of operating ports 165R (disposed toward the left end in FIG. 10).

With the steering wheel 17 rotated clockwise for a right turn, the spool 63 is rotated, relative to the sleeve 65, to the rotary operating position already described in connection with FIG. 9. In accordance with one important aspect of the present invention, the rotary valving 47 is intentionally designed such that any particular rotation of the steering wheel 17 will result in a flow through the main fluid path (the rotary valving 47) which results in a displacement of the steering cylinder 19 which is less than that selected by the steering wheel 17. In other words, for any given rotation of the steering wheel 17, a comparison of the input position signal 23 and the output position signal 27 will always result in an "error", thus resulting in the generation signal 31 indicating that additional flow is required through the axial valving 49, to achieve the desired position of the steering cylinder 19.

Therefore, during normal steering operations, there is always a correction signal 31 transmitted to the pilot stage control 33 of FIG. 1 to adjust the flow through the axial valving 49. Referring again to FIG. 2, the correction signal 31 is transmitted to the solenoid valve 113 which, assuming a right turn condition exists, results in downward movement of the valve spool 115 to drain the forward chamber 102 through the passage 117, while blocking drainage of the chamber 106 through the passage 119. As a result, pressure builds in the chamber 106, and the sleeve 65 shifts to the left in FIG. 2 to the position shown in FIG. 10. Typically the chamber 106 would be pressurized by restricting the line downstream of the return port 37, thus causing pressure to build within the spool 63, and communicating that pressure into the chamber 106 through a passage 108. Similarly, the chamber 102 may be pressurized through a passage 104.

Subsequently, the correction signal 31 will vary, thus varying the position of the spool 115 and the axial position of the spool 65, to just maintain a flow through the axial valving 49 which, when added to the flow through the rotary valving 47, results in the desired position of the steering cylinder 19.

Referring again to FIG. 10, with the sleeve 65 shifted to the left, to the position shown, each of the pressure ports 161 is in communication with one of the pressure passages 151R, the cumulative overlap therebetween defining an A1a orifice, the designation "a" after the "A1" merely indicating an orifice formed in response to relative axial motion of the spool and sleeve. Pressurized fluid entering the pressure passages 151R then flows through the axial connection passage 157, flowing into the operating passages 155R. The passages 155R are now in communication with the operating ports 165R, the cumulative overlap therebetween defining an A4a orifice. The fluid flowing through the operating ports 165R then flows into the annular chamber of 39c, combining with the fluid in the main fluid path. As was described previously, the fluid returning from the steering cylinder 19 flows through the annular chamber 41c, and from there, a portion flows through the remainder of the main fluid path, i.e., through the A5R orifice defined by the overlap between the operating ports 137R and the return passages 127R. The remainder of the fluid passes through an A5a orifice defined by the cumulative overlap between the operating ports 165L and the tank passages 159R. All of this fluid then flows into the interior of the spool 63, from where it flows to the system reservoir 13 in a "regulated" manner, to thus provide the pilot pressure required to control the axial position of the sleeve 65.

MANUAL OVERRIDE

It is contemplated that the axial valving 49 may be actuated as part of an automatic guidance system, which is in use at least part of the time in a vehicle in which an operator is still present. It is one important aspect of the present invention for the operator to manually override such an automatic guidance system in the event that, for example, the operator suddenly becomes aware of the need to deviate from the nominal vehicle path determined by the automatic guidance system. Also, it is important for the vehicle operator to be able to manually steer the vehicle, rotating the steering wheel 17 to operate the meter 55 as a hand pump. In either case, it is necessary to be able to steer by means of the rotary valving 47, without there being any flow through the axial valving 49, despite the presence of a correction signal 31.

Figure 11:
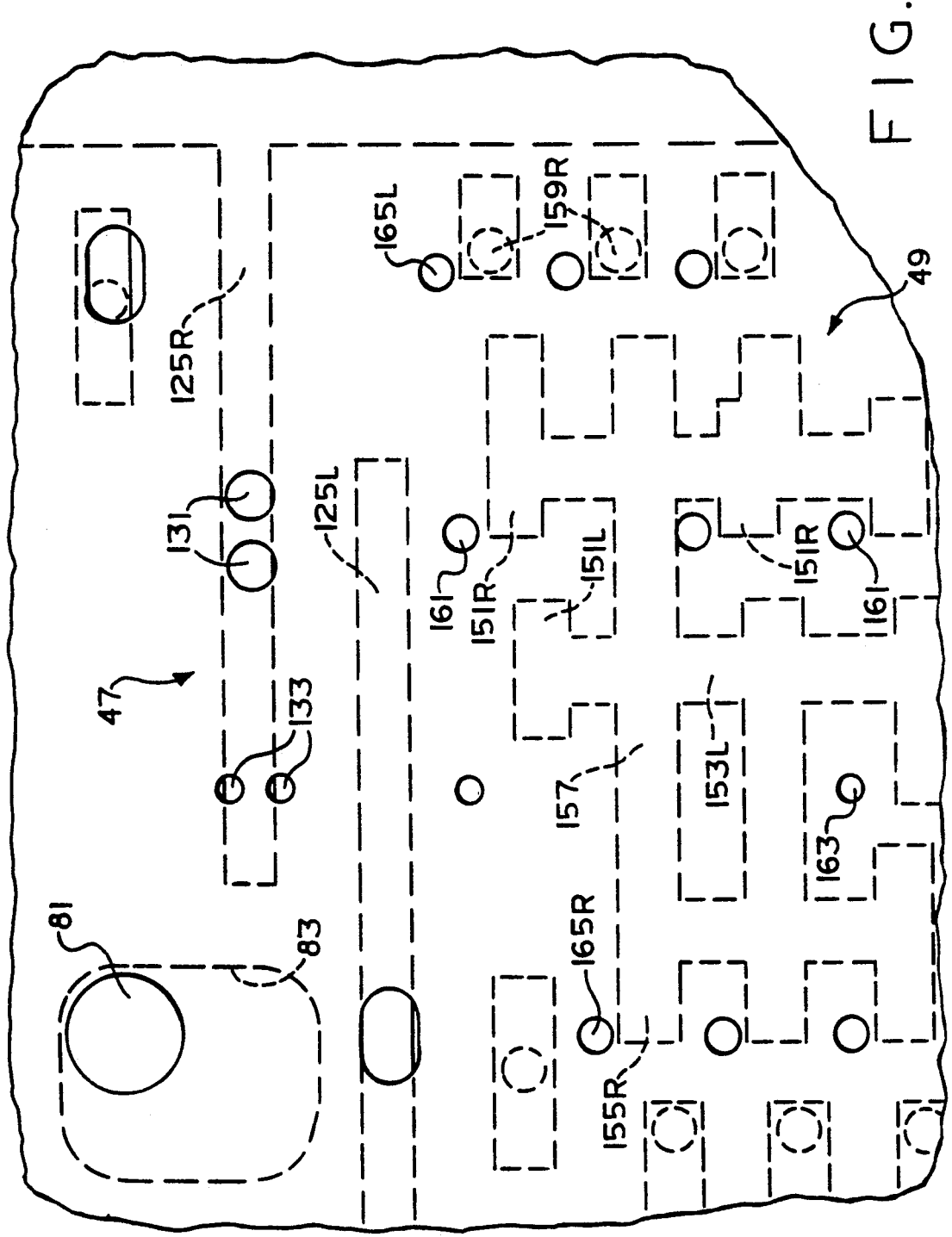
FIG. 11 is an enlarged, fragmentary, overlay view, similar to FIG. 10, and on the same scale, with the valving in a maximum rotary operating position.

Referring now to FIG. 11, the spool and sleeve have been relatively displaced to a maximum rotary operating position in which the pressure ports 131 are in fully open communication with the pressure passage 125R, to achieve maximum flow through the rotary valving 47. With the spool and sleeve in this maximum rotary operating position, it may be seen in FIG. 11 that, within the axial valving 49, the pressure ports 161 are now out of communication with the pressure passages 151R. Similarly, the operating ports 165R are out of communication with the operating passages 155R, and the operating ports 165L are out of communication with the tank passages 159R. Therefore, all of the orifices A1a, A4a, and A5a in the parallel fluid path are closed (equal to zero flow area), such that the only flow to the steering cylinder 19 is that flowing through the rotary valving 47, i.e., through the main fluid path.

As is now well known to those skilled in the art, when manually steering, using the meter 55 as a hand pump, it is essential that there not be any "short-circuit" flow paths through the controller valving. As is also well known, in a controller of the type to which the present invention relates, manual steering inherently occurs at maximum rotary valve deflection (i.e., the rotary position shown in FIG. 11). Therefore, by configuring the axial valving 49 as shown in FIG. 11, and closing off the parallel fluid path, manual steering may be accomplished. In addition, if the controller is operating as part of a vehicle guidance system, and an axial sleeve position, as illustrated in FIG. 10 is commanded, if the operator becomes aware of a need to "override" the guidance system, the steering wheel 17 can be rotated in the opposite direction to a maximum rotary operating position in the opposite direction. The spool moves "up" in FIG. 11 until the pressure passage 125L is in open communication with the pressure ports 131. At the same time, various passages defined by the spool 63 will move "up" by the same amount, and the sleeve 65 may move substantially to the right in FIG. 11 (if the electronic controls are functioning properly), or may stay in the same axial position shown in FIG. 11 (if the electronic controls are not functioning properly). In either case, each of the pressure passages 151L will now be located "above" each of the corresponding pressure ports 161, such that there is again no flow through the axial valving 49.

CONTROL LOGIC

Figure 12:
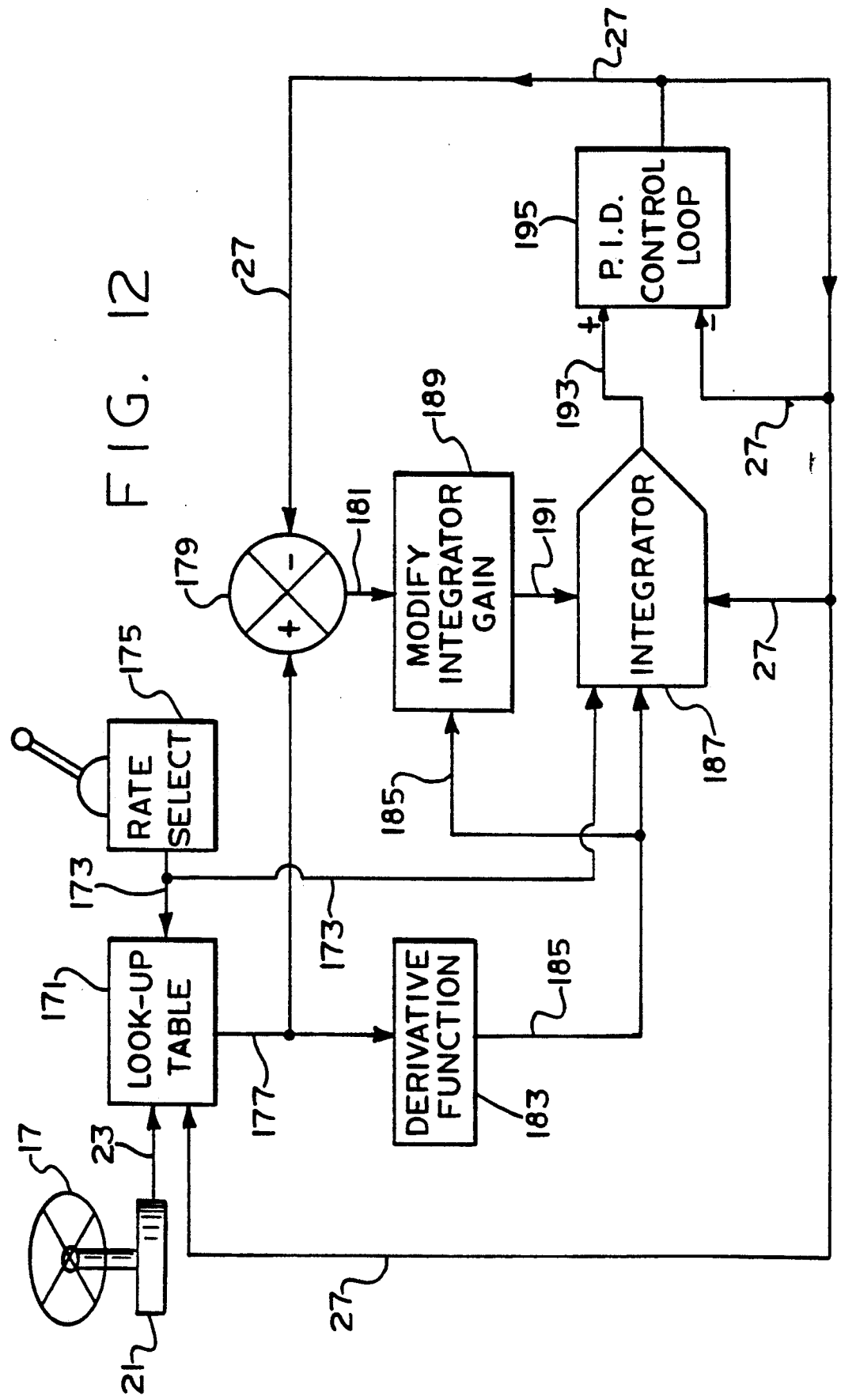
FIG. 12 is a block diagram of a control logic system in which the fluid controller of the present invention may be utilized.
Figure 13:
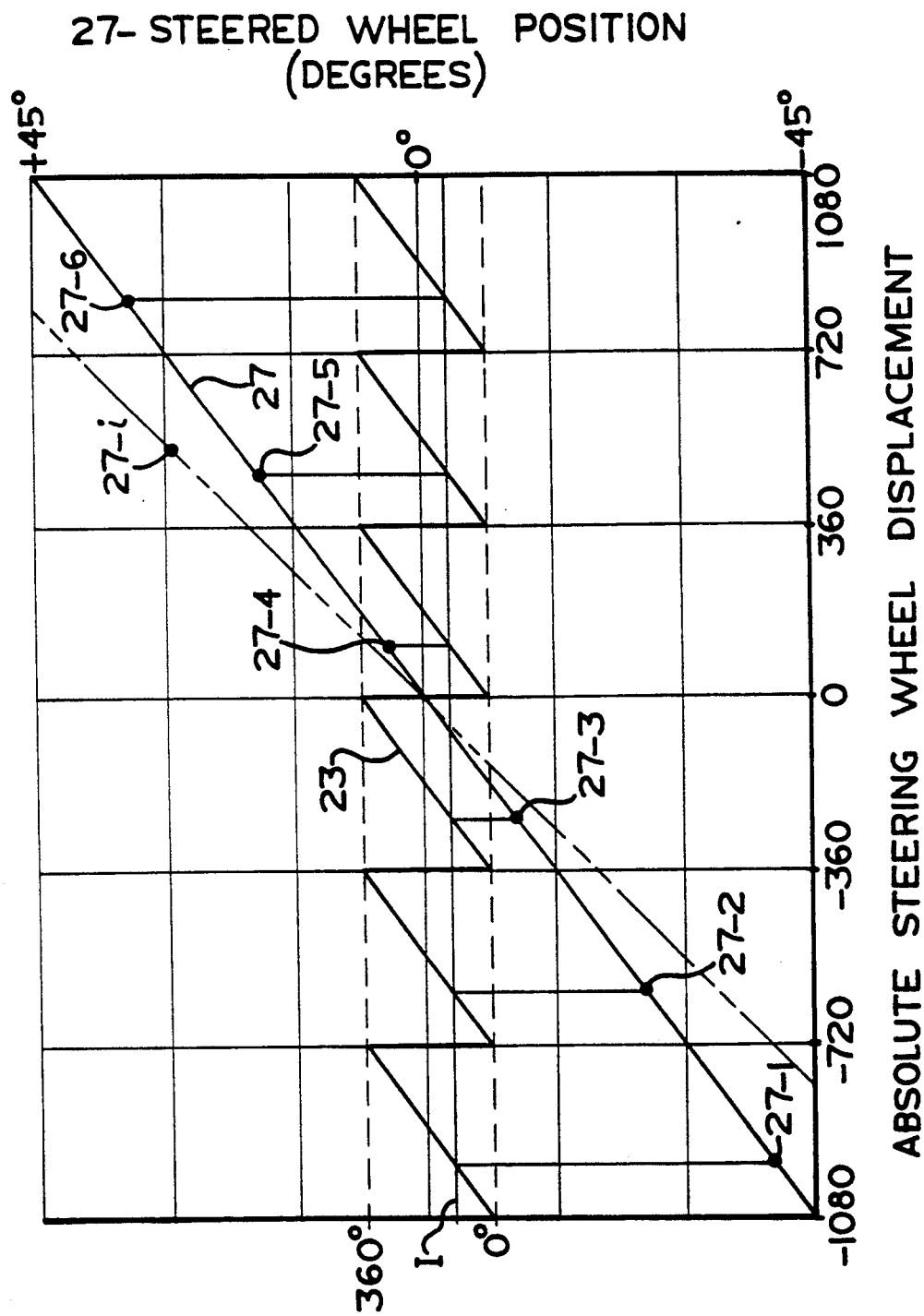
FIG. 13 is a superimposed graph of steering wheel position (in degrees) and steered wheel position (in degrees) versus absolute steering wheel displacement.

Referring now to FIGS. 12 and 13, there will be described a preferred logic control system for steering a vehicle, wherein the control system may advantageously include the fluid controller 15 which has previously been described.

Although certain of the elements in the logic diagram of FIG. 12 are the same as in the hydraulic schematic of FIG. 1, it is not thereby intended to indicate any particular relationship between the schematics of FIG. 1 and FIG. 12. The schematic of FIG. 1 was intended to illustrate primarily the fluid controller 15, and its use in a simplified system wherein the rate-select switch and controller 29 would receive the input and output position signals 23 and 27, respectively, compare those signals, and generate a resulting correction signal 31. The correction signal 31 is transmitted to the pilot stage control 33 to thereby modulate the axial valving 49 in an attempt to "null" the correction signal 31, i.e., drive the output position signal toward the input position signal, until the correction signal 31 becomes zero.

By way of contrast, the control logic diagram of FIG. 12, in conjunction with the graph of FIG. 13, is intended to serve as a basis for describing various control functions and algorithms which are believed to be important features of an overall steering system of the type which would utilize the fluid controller 15.

Referring first to FIG. 12, the diagram will be described briefly, and then the various control functions and algorithms will be described subsequently in greater detail. As in the schematic of FIG. 1, the steering wheel 17 is provided with the steering wheel position sensor 21 which generates the input position signal 23. The input position signal 23 is transmitted to a look-up table 171, which also receives a vehicle status signal 173 from a rate-select switch 175. The rate-select switch 175 may be used to provide the vehicle operator with an opportunity to manually select between two (or more) different steering "gains", i.e., different rates of change of steered wheel position for a given amount of rotation of the steering wheel 17.

Another input to the look-up table 171 is the output position signal 27 which indicates actual, instantaneous steered wheel position. The output from the look-up table 171 is a signal 177 which represents desired steered wheel angle (position). The desired steered wheel angle signal 177 is transmitted to a summer 179, the other input to which is the output position signal 27. The output of the summer 179 is a position error signal 181 which, as is well known to those skilled in the art, is basically the difference between the signals 177 and 27.

The desired steered wheel angle signal 177 is also transmitted to a derivative function circuit 183, the purpose of which is to differentiate (take the derivative of) the signal 177. Therefor, as is also well known to those skilled in the art, the output of the circuit 183 is a signal 185 which represents the rate of change of the desired steered wheel angle. This rate of change signal 185 is used in several of the control functions to be described subsequently. The rate of change signal 185 is transmitted to an integrator circuit 187, the function of which is to integrate the rate of change signal 185, i.e., convert the rate of change signal 185 back into a signal representative of position, and in this particular case, the desired position of the steered wheels. Another input to the integrator circuit 187 is the status change signal 173, for reasons to be explained subsequently.

The rate of change signal 185 is also transmitted to a circuit 189 which also receives the position error signal 181, and has as its function, to modify the gain of the integrator 187 by varying a gain signal 191. The gain signal 191 is an additional input to the integrator circuit 187, as is the output position signal 27. The output of the integrator circuit 187 is a command signal 193 which is transmitted to the positive input of a P.I.D. control loop 195, the negative input to the P.I.D. 195 being the output position signal 27. As is well known to those skilled in the art, "P.I.D." means "Proportional-Integral-Differential". In the subject embodiment, the P.I.D. control loop 195 would include at least the pilot stage control 33, the fluid controller 15, the steering cylinder 19, and the steered wheel position sensor 25, such that the output of the P.I.D. control loop 195 is, as shown in FIG. 12, the output position signal 27. The function of the P.I.D. control loop 195 is to modulate the pilot stage control 33 in response to changes in the command signal 193, such that the output position signal 27 is driven toward the command signal 193, i.e., the difference is "nulled out".

It is an important aspect of the control logic of the present invention that the command signal 193, which is representative of instantaneously commanded steered wheel position, is not merely equal to, or directly proportional to, or representative of the position of the steering wheel 17, which is the truest indication of the desired steered wheel position. Instead, the command signal 193 may differ somewhat from the desired steered wheel angle signal 177, at various times and under various circumstances, to permit the steering system to comply with several desired performance criteria. These criteria will be described briefly, and then there will be a subsequent, more detailed description of the control functions and algorithms which enable the system to comply with each of the particular criteria. The performance criteria include the following:

1. Upon vehicle start up, any "error" between actual steered wheel position (actual position of the steering cylinder 19) and the position of the steering wheel 17 should be corrected in a manner, and at a rate which is not noticeable to the vehicle operator;
2. Any change in the vehicle "status" should not result in an immediate, excessive correction of any error in the position of the steered wheels;
3. Whenever the steering wheel 17 is not being moved by the operator, there should be no movement of the steered wheels;
4. There should be movement of the steered wheels (movement of the steering cylinder 19) only when the steering wheel 17 is being moved by the operator;
5. Whenever the steering wheel is moved by the operator, the steered wheels must move in the direction expected by the operator, and in the approximate amount expected; and
6. During normal steering operations, and subject to the previous criteria, there should be no deviation of the steered wheels from the desired steered wheel angle (position).

START-UP

Referring now to FIG. 13, there is a graph of steering wheel and steered wheel position versus absolute steering wheel displacement. In other words, the graph of FIG. 13 is based upon the assumption that the steering "input device" to the fluid controller 15 is a steering wheel for which there can be more than one desired steered wheel angle corresponding to a particular steering wheel position. In the subject embodiment, by way of example only, the system of the present invention will be described in connection with a vehicle in which the steering wheel 17 can be rotated six turns lock-to-lock. In other words, from the neutral, centered position, the steering wheel 17 may be rotated three turns counterclockwise before engaging a stop, or may be rotated three turns clockwise before engaging a stop.

Superimposed on the graph of steering wheel position (input position signal 23) is a graph of steered wheel position (output position signal 27). Thus, it may be seen that, by way of example only, each rotation of the steering wheel 17 should turn the steered wheels 15 degrees, such that rotation of the steering wheel against either stop should result in turning of the steered wheels 45 degrees in that particular direction. Upon engine or vehicle start up, several different criteria and control functions come into play.

Whenever the vehicle engine starts, or there is some other change in the vehicle status, such as the rate select switch 175 being moved to a different "Rate" position, an appropriate vehicle status signal 173 is transmitted to the look up table 171, and to the integrator circuit 187. Whenever the status signal 173 indicates a status change, the integrator circuit 187 is reset, and the command signal 193 is initialized to be equal to the steered wheel position signal 27 so that, initially, no correction of steered wheel position is made. This satisfies the foregoing criteria numbers one and two.

After the instantaneous initialization, correction can occur in view of the possibility of misalignment of the steering and steered wheels. Referring again to both FIGS. 12 and 13, upon start-up, the steering wheel position is sensed in the normal manner, and the instantaneous steering wheel position 23 is transmitted to the look up table 171. If the instantaneous steering wheel position is represented by the line labeled "I" in the graph of FIG. 13, it may be seen that that Particular steering wheel position could correspond to any one of six different steered wheel positions on the graph 27. Note the six vertical lines extending to the graph 27 from the six intersections of the line I and the graph 23. It should also be noted in FIG. 13 that there is a dashed line including a point "27$i$", representing initial steered wheel position.

The initial steered wheel position signal 27$i$ is then compared mathematically with each of the theoretically possible steered wheel position signal 27-1 through 27-6, to see which pair of signals has the smallest absolute difference. In the example presented in FIG. 13, it may be seen that the least absolute difference exists between the initial signal 27$i$ and the signal 27-5, thus indicating that the steered wheel position signal 27 should be equal to the signal 27-5, above the fifth ramp of the steering wheel position signal 23.

In the example shown in FIG. 13, the initial steered wheel position signal 27$i$ is disposed to the right of the signal 27-5, which means that the actual steered wheel position (signal 27$i$) is "leading" the desired steered wheel position (signal 27-5), assuming steering wheel rotation in the clockwise direction. As a result, in order to achieve correction of the error between the signal 27$i$ and 27-5, a gain factor of less than 1.0 is applied by the circuit 189 in generating the gain signal 191 which determines the gain of the integrator circuit 187. By "leading", it is meant that the steered wheels are displaced further in the direction of steering than is the steering wheel. By way of contrast, if the initial steered wheel position signal 27$i$ were disposed to the left of the desired position signal 27-5, still assuming steering wheel rotation in the clockwise direction, such would be an indication that the steered wheel position is "lagging" the steering wheel position, in which case the circuit 189 would generate a gain signal 191 greater than 1.0, to enable the actual steered wheel position to catch up to the steering wheel position. By way of example only, in the subject embodiment, when the steered wheel position is leading, a gain of 0.8 is applied, whereas when the steered wheel position is lagging, a gain of 1.2 is applied. As will be apparent to those skilled in the art, the amount the gain signal 191 deviates from 1.0 could be a function of the relative magnitude of the position error signal 181.

NORMAL STEERING

During normal steering, after the initial start-up procedure described above, the P.I.D. control loop 195 is constantly being "driven" by controlling the flow of fluid to the steering cylinder 19, to "null out" any error between the steered wheel position signal 27 and the command signal 193.

During normal steering, or more precisely, during normal vehicle operation, there are two possible operating conditions of the steering wheel 17. Either the wheel is being rotated at some rate, or the wheel is stationary.

In accordance with criteria number 3, if the steering wheel 17 is stationary, there should be no movement of the steered wheels. In other words, there should be no "drift" of the steered wheels. It is partly because of the two performance criteria involving the presence or absence of the steering wheel movement that the derivative function circuit 183 is included in the logic control system of FIG. 12. When the steering wheel is stationary, the rate of change signal 185 is 0 (the derivative of a constant equals 0). When the rate of change signal 185 is 0, the function of the integrator circuit 187 is to generate a command signal 193 which will drive the P.I.D. control loop 195 to maintain the steered wheel position signal 27 constant. It should be clearly understood that requiring that there be no movement of the steered wheels, when there is no movement of the steering wheel 17, does not mean that there will not be any flow of fluid to the steering cylinder 19. In a typical full-fluid link hydrostatic power steering system, fluid leakage within the system typically results in movement of the steered wheels even in the absence of movement of the steering wheel. Therefor, it is one feature of the logic control system of the present invention to generate an appropriate command signal 193 such that a small amount of fluid, if needed, will be communicated to the steering cylinder 19 to maintain a fixed steered wheel position as long as the steering wheel 17 is stationary.

When the vehicle operator begins to rotate the steering wheel 17, the steered wheel signal 177 changes, and the derivative function circuit 183 produces a rate of change signal 185 which is not equal to zero. Only when the integrator circuit 187 is receiving a rate of change signal 185 which is not equal to zero will it generate a command signal 193 which is capable of permitting a change in the steered wheel position, and thus, in the position signal 27. Thus, performance criteria numbers 3 and 4 above are satisfied.

While the vehicle operator is rotating the steering wheel, the sign (positive or negative) of the rate of change signal 185 indicates the direction of rotation of the steering wheel. The integrator circuit 187 receives the signal 185 and senses the sign of the signal 185, and insures that an appropriate command signal 193 is generated such that the direction of movement of the cylinder 19 corresponds to the direction of rotation of the steering wheel. Thus, performance criteria number 5 above is satisfied.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A method of controlling the flow of fluid from a source of pressurized fluid through a fluid controller in response to the position and movement of an input device, to cause the position of a steering cylinder to conform to the position of said input device, said method comprising the steps of:
   (a) providing said fluid controller with main valving operable to define a main fluid path, and control fluid flow therethrough, in response to the movement of said input device, and auxiliary valving operable to define an auxiliary fluid path, and control the fluid flow therethrough, in response to changes in a command signal;
   (b) sensing the position of said input device, and generating an input position signal;
   (c) sensing the position of said steering cylinder, and generating an output position signal;
   (d) comparing said output position signal to said input position signal, and generating said command signal;
   (e) transmitting a signal representative of said command signal to said auxiliary valving and modulating said auxiliary valve to drive said output position signal toward said input position signal, and
   (f) sensing a vehicle status change, generating a status change signal in response to the sensing of a vehicle status change, and setting said command signal equal to said output position signal in response to the presence of said status change signal.

2. A method of controlling the flow of fluid from a source of pressurized fluid through a fluid controller in response to the position and movement of an input device, to cause the position of a steering cylinder to conform to the position of said input device, said method comprising the steps of:
   (a) providing said fluid controller with valving which defines:
      (i) main valving operable to define a main fluid path, and control fluid flow therethrough, in response to the movement of said input device, and
      (ii) auxiliary valving operable to define an auxiliary fluid path, said auxiliary fluid path having upstream and downstream locations in communication with said main fluid path, said upstream and downstream locations being disposed within said controller, said auxiliary valving being operable to control the fluid flow through said auxiliary fluid path, in response to changes in a command signal;
   (b) sensing the position of said input device, and generating an input position signal;
   (c) sensing the position of said steering cylinder, and generating an output position signal;
   (d) comparing said output position signal to said input position signal, and generating said command signal;
   (e) transmitting a signal representative of said command signal to said auxiliary valving and modulating said auxiliary valve to drive said output position signal toward said input position signal; and
   (f) sensing a vehicle status change, generating a status change signal in response to the sensing of a vehicle status change, and setting said command signal equal to said output position signal in response to the presence of said status change signal.

3. A method of controlling the flow of fluid from a source of pressurized fluid through a fluid controller in response to the position and movement of an input device, to cause the position of a steering cylinder to conform to the position of said input device, said method comprising the steps of:
  (a) providing said fluid controller with valving which defines:
    (i) main valving operable to define a main fluid path and control fluid flow therethrough, in response to the movement of said input device, and
    (ii) auxiliary valving operable to define an auxiliary fluid path, said auxiliary fluid path having upstream and downstream locations in communication with said main fluid path, said upstream and downstream locations being disposed within said controller, said auxiliary valving being operable to control the fluid flow through said auxiliary fluid path, in response to changes in a command signal;
  (b) sensing the position of said input device, and generating an input position signal;
  (c) sensing the position of said steering cylinder, and generating an output position signal;
  (d) comparing said output position signal to said input position signal, and generating said command signal;
  (e) transmitting a signal representative of said command signal to said auxiliary valving and modulating said auxiliary valve to drive said output position signal toward said input position signal; and
  (f) providing an input device which is rotatable by an amount greater than one rotation from a counterclockwise stop position to a clockwise stop position, and upon vehicle start-up, determining a plurality of desired positions of said steering cylinder corresponding to said input position signal; comparing said output position signal to each of said plurality of desired positions and selecting the desired position having the least absolute difference, compared to said output position signal; and, if an error exists between said output position signal and said input position signal, modifying said command signal by a factor greater than 1.0 if said steering cylinder is lagging said input device, or by a factor less than 1.0 if said steering cylinder is leading said input device.

4. A method of controlling the flow of fluid from a source of pressurized fluid through a fluid controller in response to the position and movement of an input device, to cause the position of a steering cylinder to conform to the position of said input device, said method comprising the steps of:
  (a) providing said fluid controller with valving which defines:
    (i) main valving operable to define a main fluid path, and control fluid flow therethrough, in response to the movement of said input device, and
    (ii) auxiliary valving operable to define an auxiliary fluid path, said auxiliary fluid path having upstream and downstream locations in communication with said main fluid path, said upstream and downstream locations being disposed within said controller, said auxiliary valving being operable to control the fluid flow through said auxiliary fluid path, in response to changes in a command signal;
  (b) sensing the position of said input device, and generating an input position signal, generating a derivative signal representative of the rate of change of said input position signal, and generating said command signal operable to prevent movement of said steering cylinder whenever said derivative signal indicates absence of movement of said input device;
  (c) sensing the position of said steering cylinder, and generating an output position signal;
  (d) comparing said output position signal to said input position signal, and generating said command signal; and
  (e) transmitting a signal representative of said command signal to said auxiliary valving and modulating said auxiliary valve to drive said output position signal toward said input position signal.

5. A method of controlling the flow of fluid from a source of pressurized fluid through a fluid controller in response to the position and movement of an input device, to cause the position of a steering cylinder to conform to the position of said input device, said method comprising the steps of:
  (a) providing said fluid controller with valving which defines:
    (i) main valving operable to define a main fluid path, and control fluid flow therethrough, in response to the movement of said input device, and
    (ii) auxiliary valving operable to define an auxiliary fluid path, said auxiliary fluid path having upstream and downstream locations in communication with said main fluid path, said upstream and downstream locations being disposed within said controller, said auxiliary valving being operable to control the fluid flow through said auxiliary fluid path, in response to changes in a command signal;
  (b) sensing the position of said input device, and generating an input position signal, and generating a derivative signal representative of the rate of change of said input position signal, and direction of change of said input position signal, and generating said command signal operable to cause movement of said steering cylinder only while said derivative signal indicates movement of said input device, and only in the direction corresponding to the direction of movement of said input device;
  (c) sensing the position of said steering cylinder, and generating an output position signal;
  (d) comparing said output position signal to said input position signal, and generating said command signal; and
  (e) transmitting a signal representative of said command signal to said auxiliary valving and modulating said auxiliary valve to drive said output position signal toward said input position signal.

* * * * *